United States Patent
Nakasu et al.

(10) Patent No.: US 11,207,777 B2
(45) Date of Patent: Dec. 28, 2021

(54) ROBOT CONTROLLING DEVICE AND AUTOMATIC ASSEMBLING SYSTEM

(71) Applicant: Hitachi, Ltd., Tokyo (JP)

(72) Inventors: Nobuaki Nakasu, Tokyo (JP); Kei Imazawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 488 days.

(21) Appl. No.: 16/237,156

(22) Filed: Dec. 31, 2018

(65) Prior Publication Data
US 2019/0217472 A1    Jul. 18, 2019

(30) Foreign Application Priority Data
Jan. 12, 2018 (JP) .............................. JP2018-003123

(51) Int. Cl.
| | |
|---|---|
| *G05B 19/04* | (2006.01) |
| *G05B 19/18* | (2006.01) |
| *B25J 9/16* | (2006.01) |
| *B23P 19/04* | (2006.01) |

(52) U.S. Cl.
CPC ............ *B25J 9/1666* (2013.01); *B23P 19/04* (2013.01)

(58) Field of Classification Search
CPC ........ B23P 19/04; B25J 9/1666; B25J 9/1676; G05B 2219/40203
See application file for complete search history.

(56) References Cited

U.S. PATENT DOCUMENTS

| | | | | |
|---|---|---|---|---|
| 9,114,532 | B2* | 8/2015 | Ogawa | .................. B25J 9/1674 |
| 2014/0067121 | A1* | 3/2014 | Brooks | .................. B25J 9/1676 |
| | | | | 700/255 |
| 2015/0094879 | A1* | 4/2015 | Pari | ......................... B25J 5/007 |
| | | | | 701/2 |
| 2017/0197313 | A1* | 7/2017 | Nishino | ............. A61B 5/02055 |
| 2019/0061155 | A1* | 2/2019 | Hashimoto | ............ B25J 9/1694 |
| 2019/0063907 | A1* | 2/2019 | Grau | ..................... H04N 5/3572 |

FOREIGN PATENT DOCUMENTS

| | | | | |
|---|---|---|---|---|
| DE | 102018211943 | A1 * | 1/2020 | ......... G01S 13/9082 |
| JP | 2010-028002 | A * | 3/2009 | |
| JP | 2010-240782 | A | 10/2010 | |
| JP | 2011-125975 | A | 6/2011 | |

* cited by examiner

*Primary Examiner* — Harry Y Oh
(74) *Attorney, Agent, or Firm* — Procopio, Cory, Hargreaves & Savitch LLP

(57) ABSTRACT

A robot controlling device inputs an operation state of a worker from a sensor. The robot controlling device calculates a position vector and a velocity vector of each of the robot and the worker from the operation state of the robot and the operation state of the worker, generates a risk determination area (an area where the robot is stopped, an area where the robot is evacuated, and an area where the robot is decelerated) around each of the robot and the worker, determines a risk based on overlapping between the generated risk determination area of the robot and the generated risk determination area of the worker, generates a collision avoidance trajectory in which collision between the robot and the worker is avoided from a result of the determination, and controls the robot based on the generated collision avoidance trajectory.

12 Claims, 14 Drawing Sheets

[FIG. 1]
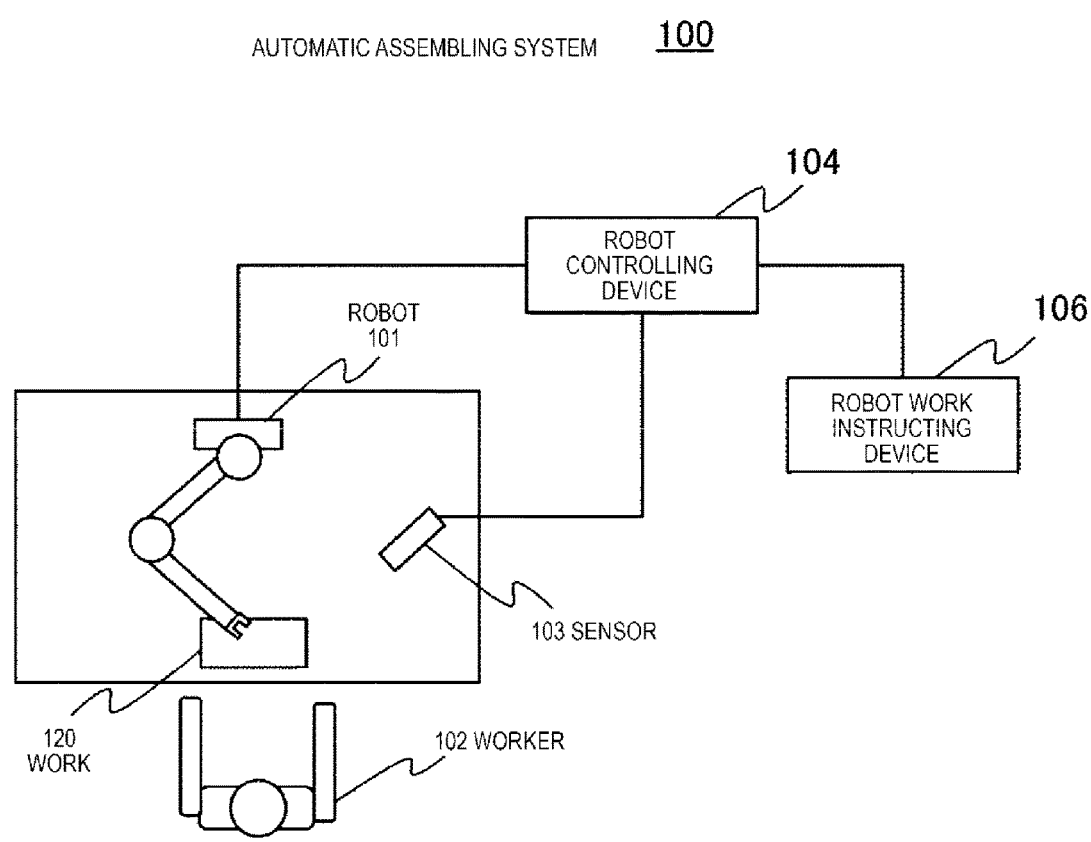

[FIG. 2]
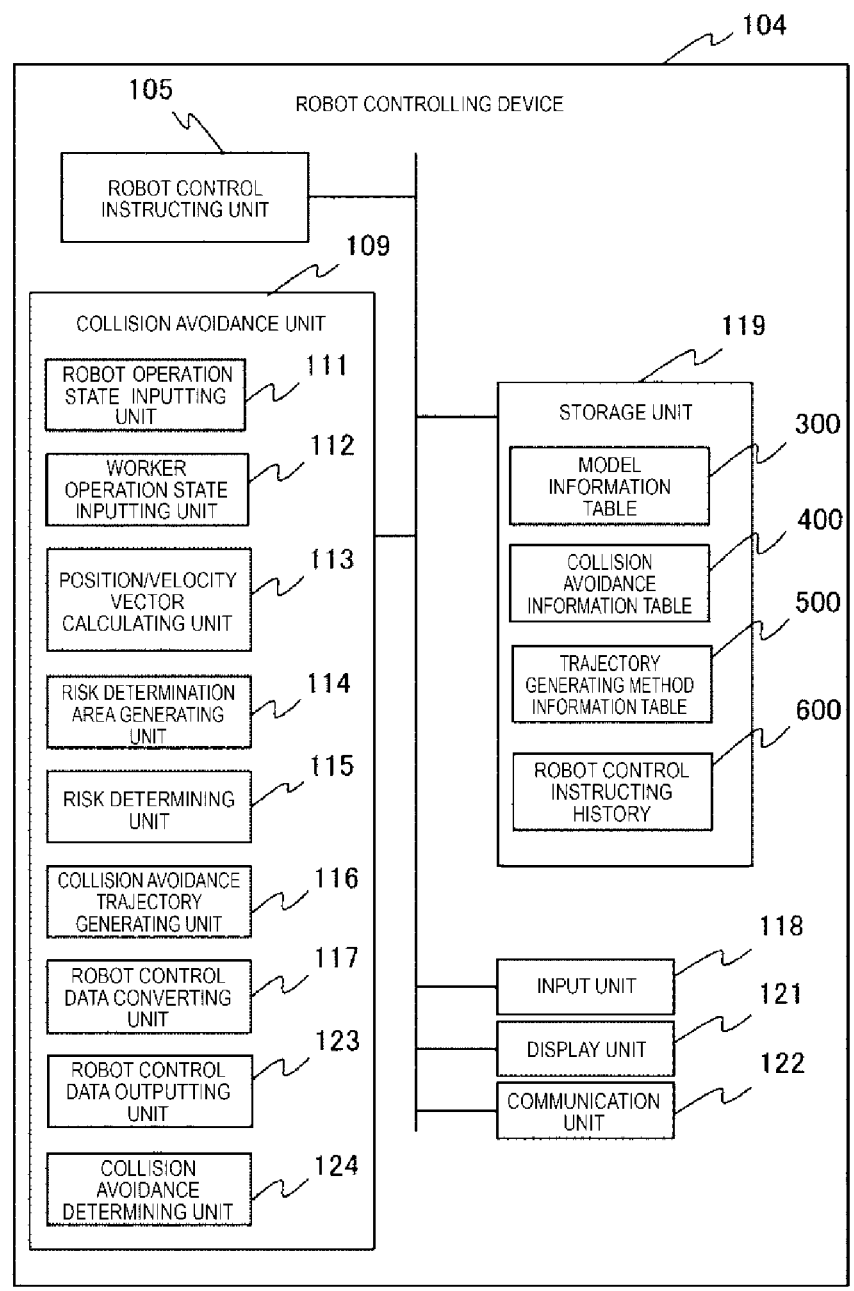

[FIG. 3]

MODEL INFORMATION TABLE    300

| LARGE ITEM | MIDDLE ITEM | SMALL ITEM | EXAMPLE |
|---|---|---|---|
| ROBOT MODEL INFORMATION 301a | NUMBER OF LINKS | — | 6 |
| | LINK DIMENSION | L1 | (400, 400, 400) |
| 301b | | L2 | (400, 400, 300) |
| | | L3 | (200, 200, 600) |
| | | L4 | (100, 100, 100) |
| | | L5 | (100, 100, 600) |
| | | L6 | (80, 80, 100) |
| | | L7 | (50, 50, 50) |
| 301c | LINK CONNECTION INFORMATION | JOINT 1 | (L1, L2, ROTATION) |
| | | JOINT 2 | (L2, L3, ROTATION) |
| | | JOINT 3 | (L3, L4, ROTATION) |
| | | JOINT 4 | (L4, L5, ROTATION) |
| | | JOINT 5 | (L5, L6, ROTATION) |
| 301d | | JOINT 6 | (L6, L7, ROTATION) |
| 301e | ROBOT REPRESENTATIVE POINT COORDINATES | — | (100, 130, 0) |
| 301f | GRIPPED OBJECT SIZE | — | (100, 120, 30) |
| | GRIPPING COORDINATES | — | (80, 110, 0) |
| WORKER MODEL INFORMATION 302a | NUMBER OF LINKS | — | 4 |
| | LINK DIMENSION | L1 | (100, 100, 300) |
| 302b | | L2 | (100, 100, 10) |
| | | L3 | (100, 100, 10) |
| | | L4 | (80, 80, 80) |
| 302c | LINK CONNECTION INFORMATION | JOINT 1 | (L1, L2, ROTATION) |
| | | JOINT 2 | (L2, L3, ROTATION) |
| 302d | | JOINT 3 | (L3, L4, ROTATION) |
| 302e | WORKER REPRESENTATIVE POINT COORDINATES | — | (100, 130, 0) |
| 302f | GRIPPED OBJECT SIZE | — | (100, 120, 30) |
| | GRIPPED OBJECT INSTALLATION COORDINATES | — | (80, 110, 0) |
| WORK ENVIRONMENT MODEL INFORMATION 303a | WORK POSITION COORDINATES | — | (2000, 1100, 300) |
| 303b | WORKBENCH INFORMATION | SHAPE DIMENSION | 3D-CAD DATA |
| 303c | ROBOT ORIGIN POSITION | — | (1500, 1100, 500) |
| 303d | WORKER ORIGIN POSITION | — | (2500, 1100, 500) |
| 303e | SENSOR INSTALLATION ORIGIN POSITION | — | (1000, 700, 1500) |

[FIG. 4]

COLLISION AVOIDANCE INFORMATION TABLE 400

| LARGE ITEM | MIDDLE ITEM | EXAMPLE |
|---|---|---|
| COLLISION AVOIDANCE TIME | STOP AREA COLLISION AVOIDANCE TIME | 0.5 SECONDS |
| | EVACUATION AREA COLLISION AVOIDANCE TIME | 1 SECOND |
| | DECELERATION AREA COLLISION AVOIDANCE TIME | 3 SECONDS |
| DECELERATION CONDITION | DECELERATION OPERATING VELOCITY UPPER LIMIT | 250mm / SECOND |
| | AGAINST WORKER VELOCITY RATIO | 60% |
| | AGAINST ROBOT INSTRUCTING VALUE VELOCITY RATIO | 70% |
| RISK DETERMINATION AREA WIDTH | STOP AREA RISK DETERMINATION AREA WIDTH | 2cm |
| | EVACUATION AREA RISK DETERMINATION AREA WIDTH | 2cm |
| | DECELERATION AREA RISK DETERMINATION AREA WIDTH | 5cm |
| APPROACH DISTANCE INFORMATION | MINIMUM APPROACH DISTANCE | 100mm |

[FIG. 5]

TRAJECTORY GENERATING METHOD INFORMATION TABLE 500

| LARGE ITEM | MIDDLE ITEM | EXAMPLE |
|---|---|---|
| NUMBER OF TRAJECTORY GENERATING METHODS | — | 2 |
| TRAJECTORY GENERATING METHOD INFORMATION | METHOD NUMBER | 1 |
| | METHOD NAME | REVERSE OPERATION METHOD |
| | ALGORITHM LINK INFORMATION | PATH TO PROGRAM |
| | PRIORITY | 1 |
| | COLLISION AVOIDANCE DETERMINATION RESULT | AVOIDABLE |
| | COLLISION AVOIDANCE TRAJECTORY DATA | (0,20.5) (0,22,7)... |
| TRAJECTORY GENERATING METHOD INFORMATION | METHOD NUMBER | 2 |
| | METHOD NAME | PARALLEL OPERATION METHOD |
| | ALGORITHM LINK INFORMATION | PATH TO PROGRAM |
| | PRIORITY | 2 |
| | COLLISION AVOIDANCE DETERMINATION RESULT | AVOIDABLE |
| | COLLISION AVOIDANCE TRAJECTORY DATA | (0,20.5) (0,24,6)... |

501 → (NUMBER OF TRAJECTORY GENERATING METHODS row)
502 → (TRAJECTORY GENERATING METHOD INFORMATION row)
502a → METHOD NUMBER
502b → METHOD NAME
502c → ALGORITHM LINK INFORMATION
502d → PRIORITY
502e → COLLISION AVOIDANCE DETERMINATION RESULT
502f → COLLISION AVOIDANCE TRAJECTORY DATA

[FIG. 6]
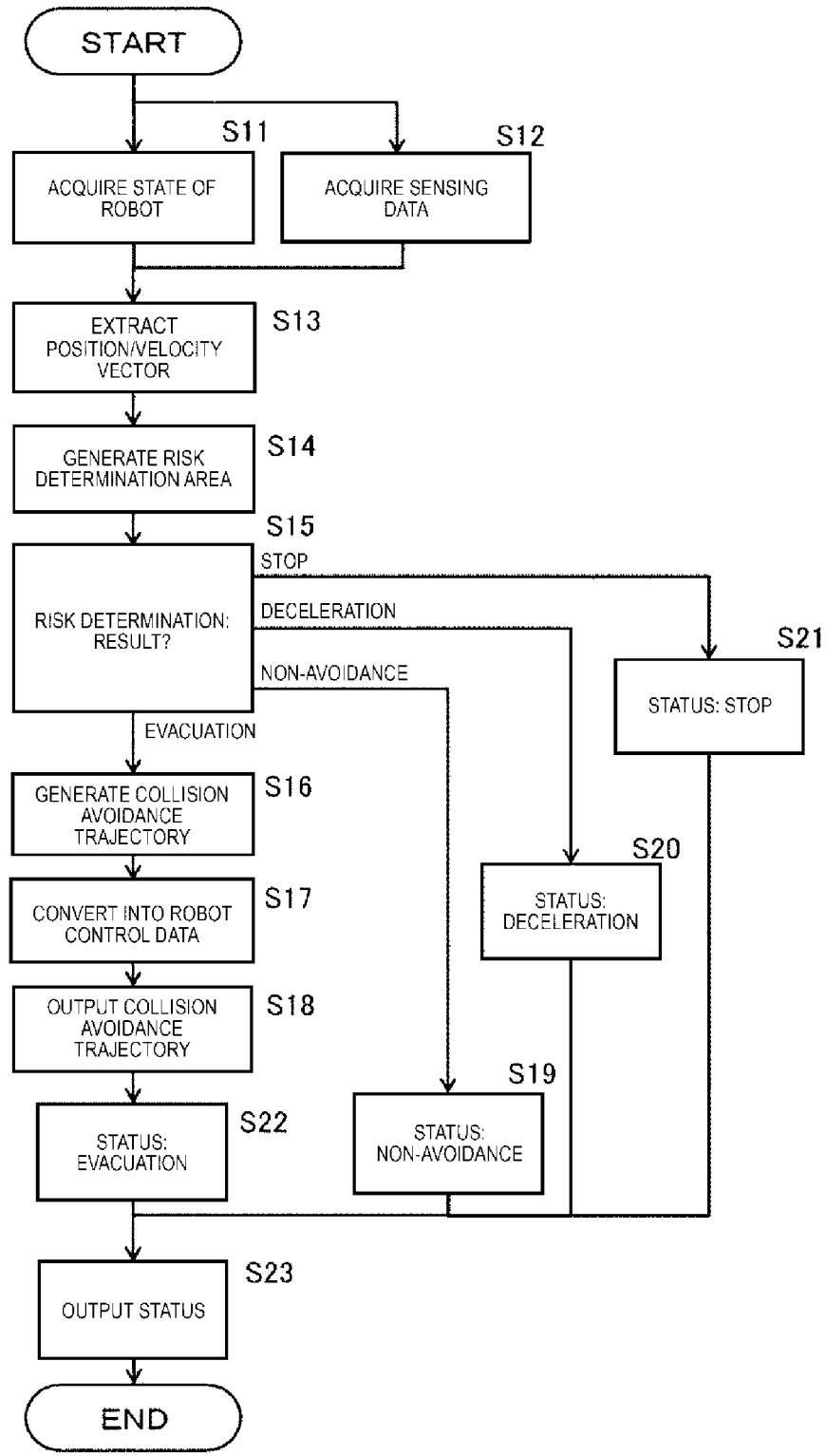

[FIG. 7]
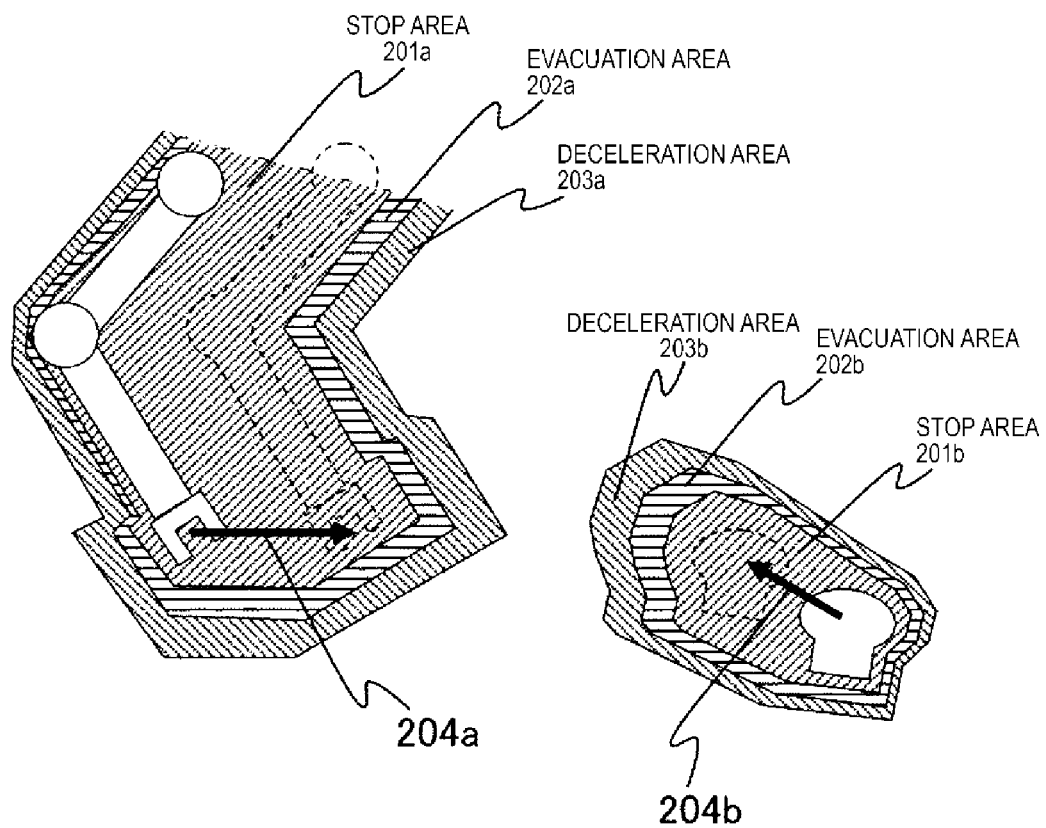

[FIG. 8]
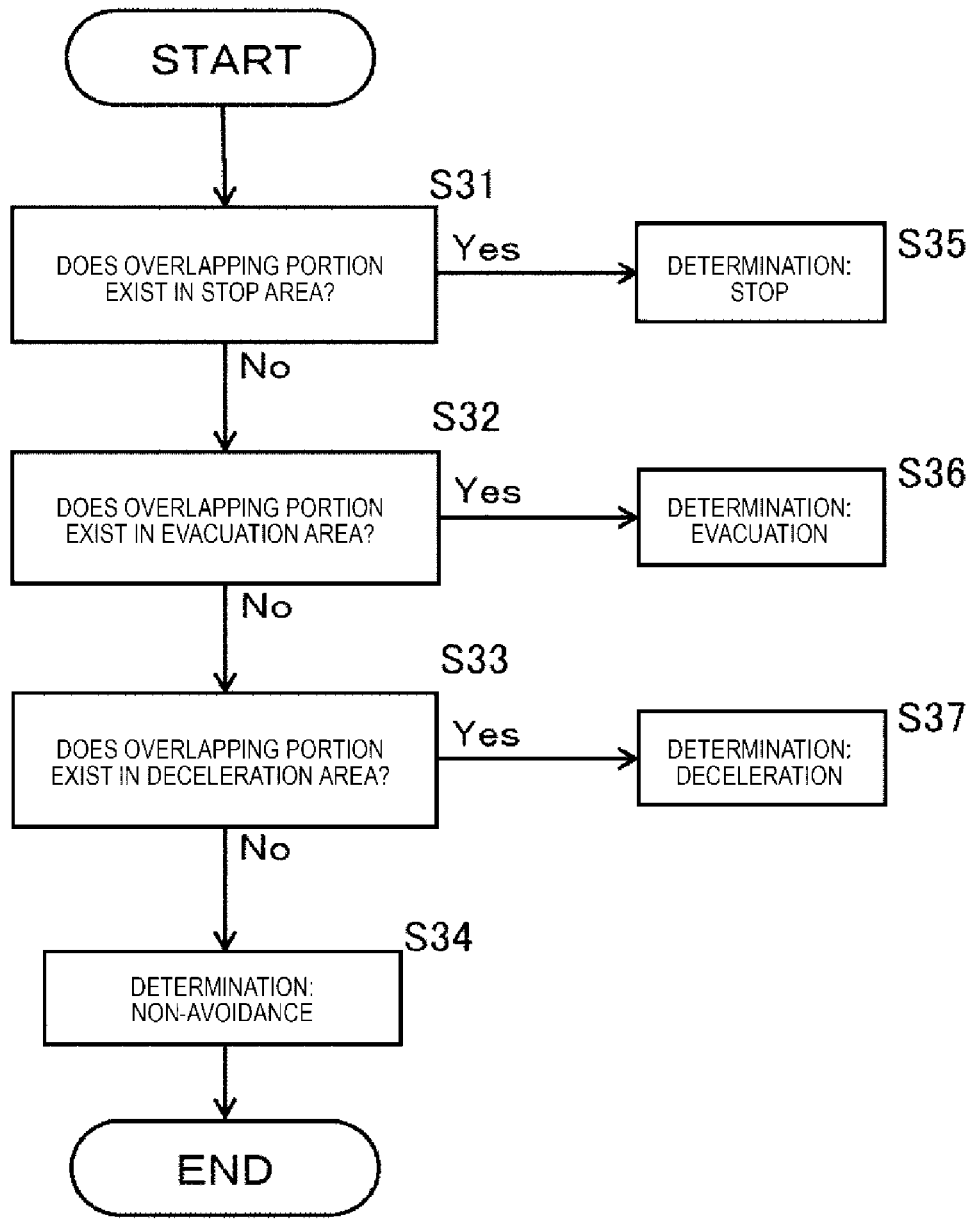

[FIG. 9]
(a)
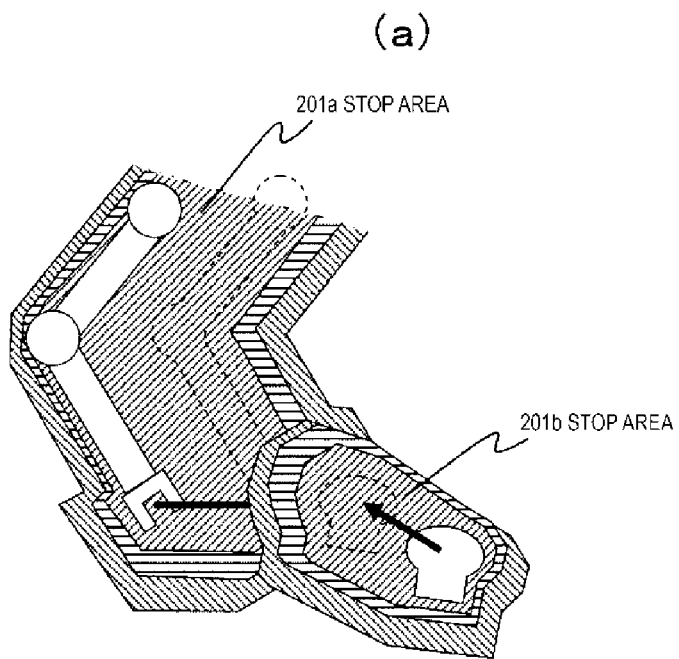
201a STOP AREA
201b STOP AREA
(b)
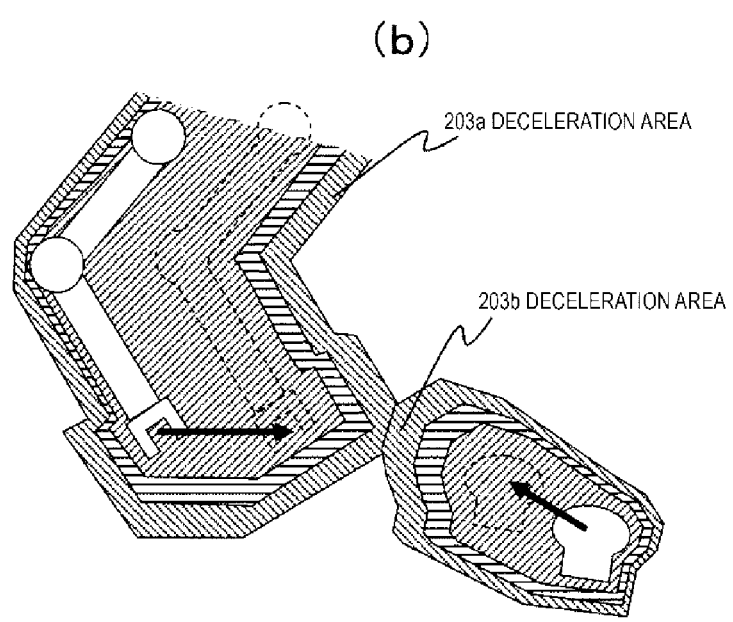
203a DECELERATION AREA
203b DECELERATION AREA

[FIG. 10]
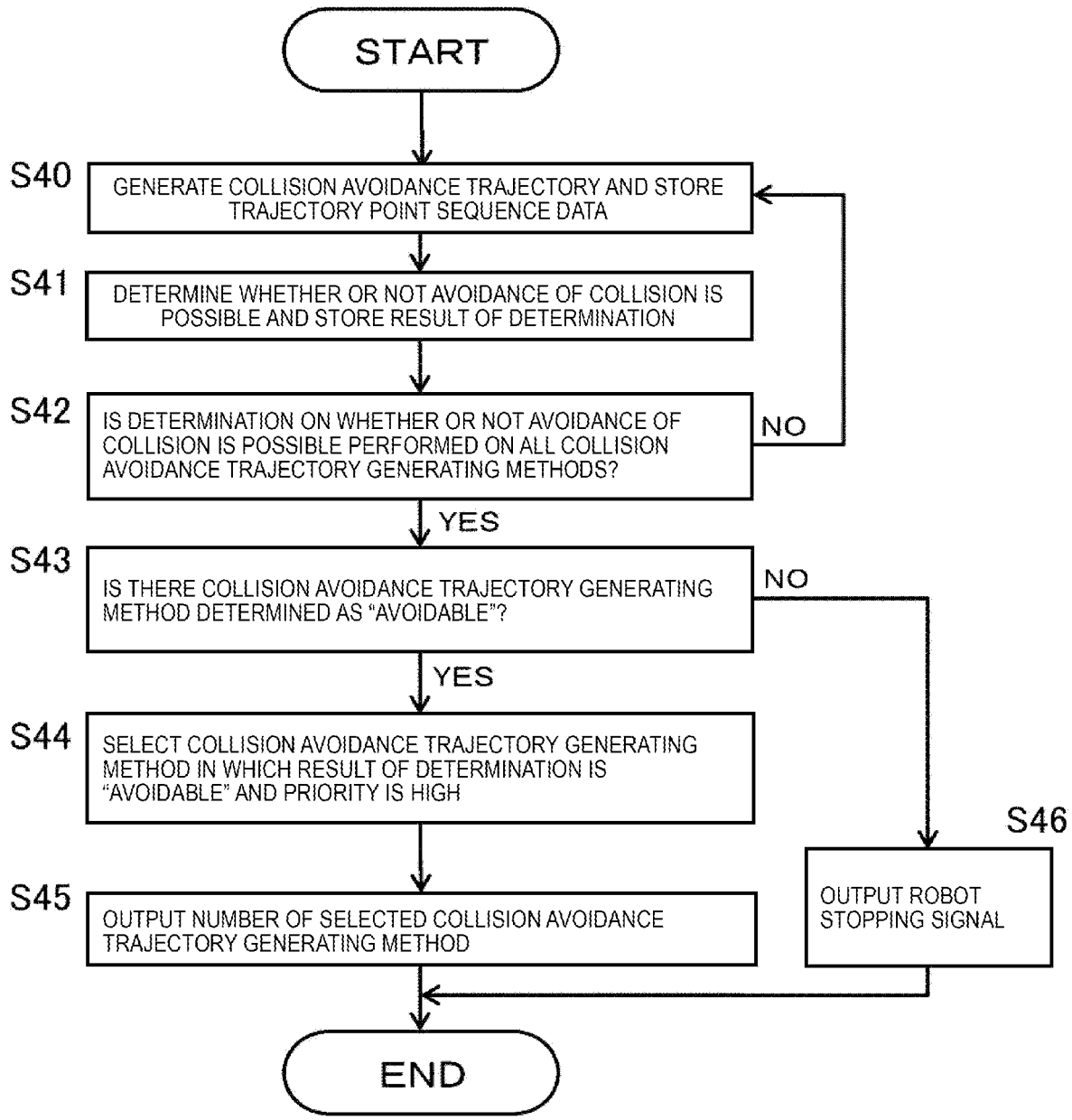

[FIG. 11]
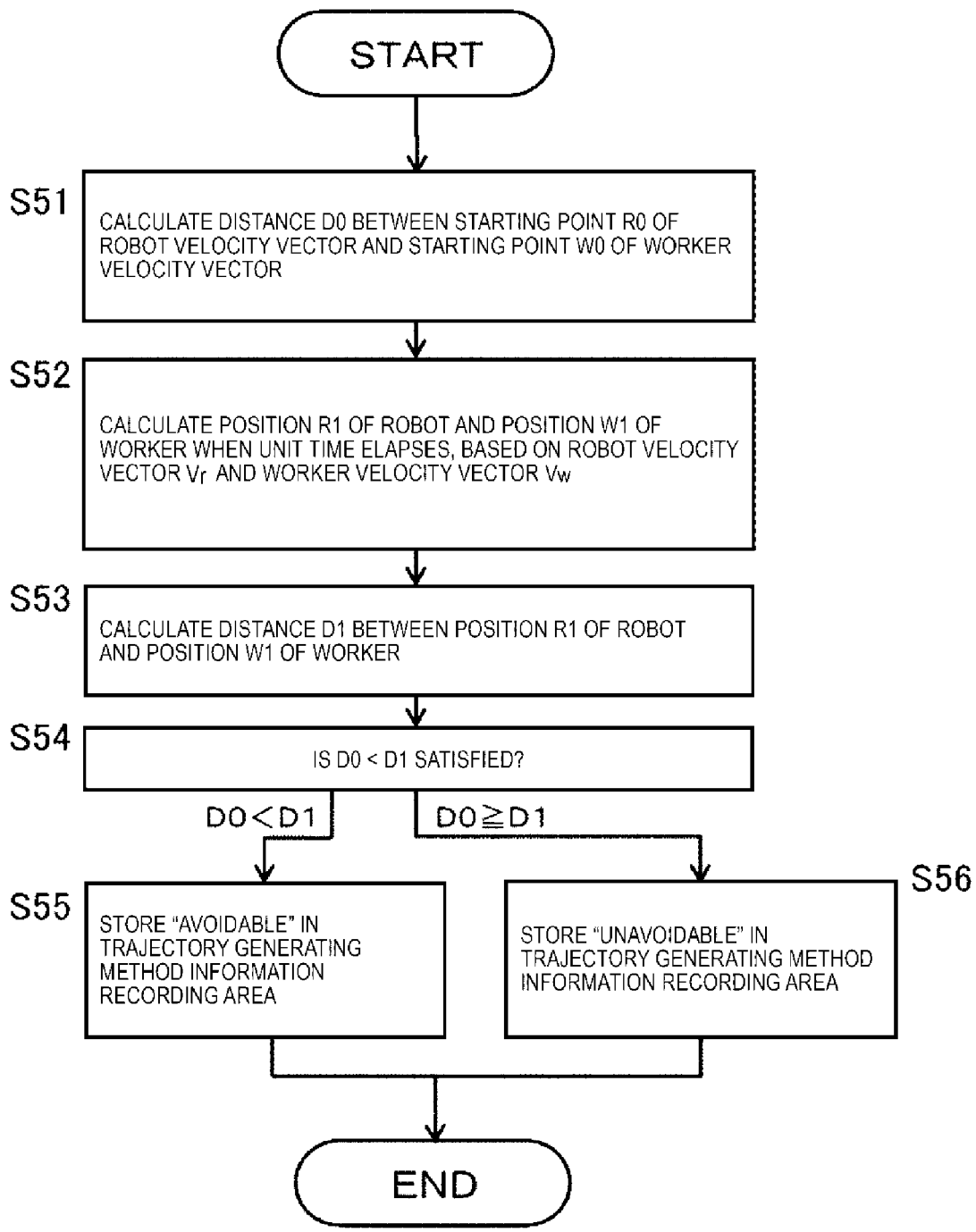

[FIG. 12]
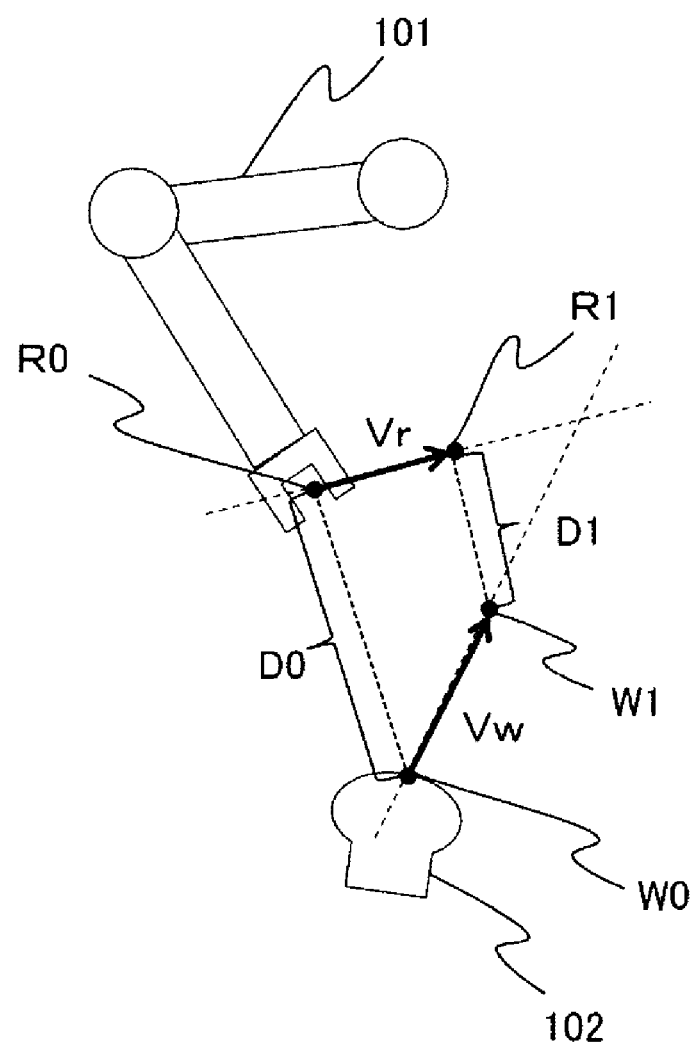

[FIG. 13]
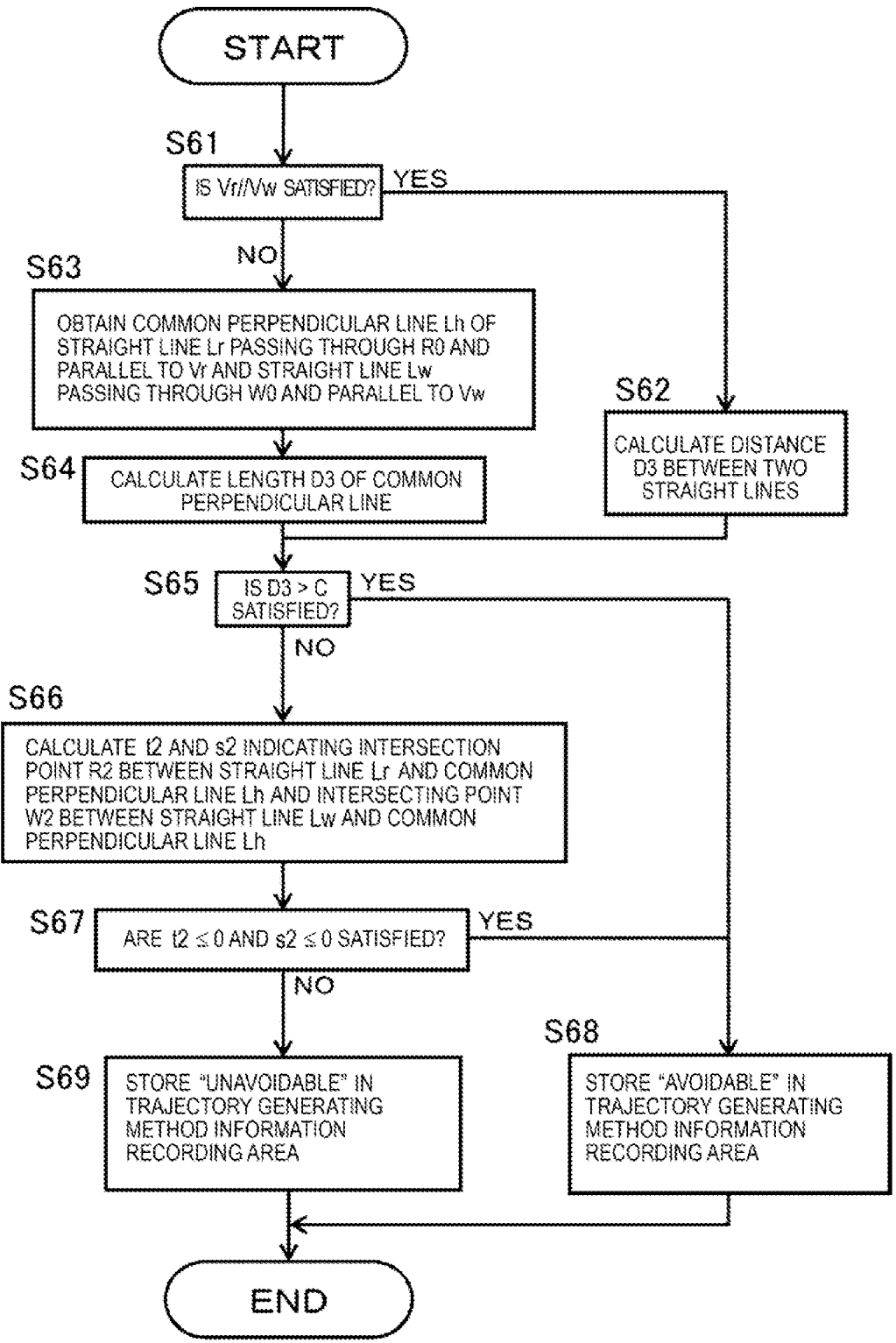

[FIG. 14]
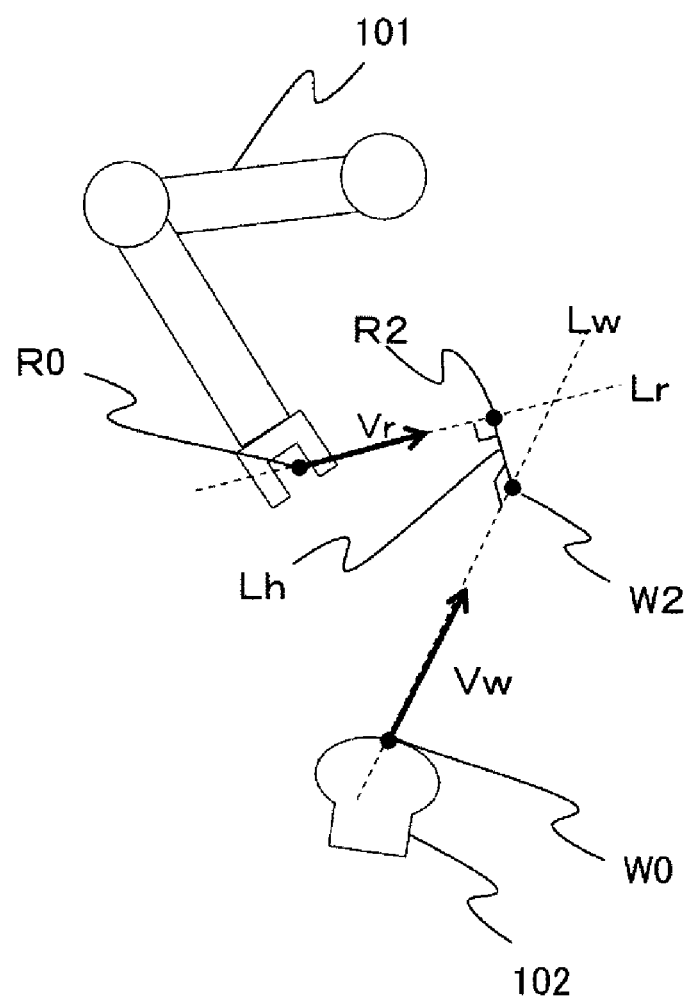

ROBOT CONTROLLING DEVICE AND AUTOMATIC ASSEMBLING SYSTEM

TECHNICAL FIELD

The present invention relates to a robot controlling device and an automatic assembling system, and more particularly, to a robot controlling device and an automatic assembling system which are suitable for improving safety of a worker and improving an operation rate of a line when the worker and a robot collaborate with each other to perform an assembling operation.

BACKGROUND ART

With a decrease in a workforce population ratio and an increase in a labor wage, an automatic assembling machine (an assembling robot) has been introduced to a production line. In the introduction of the assembling robot, it is necessary to install the assembling robot in a safety fence such that contact with a worker does not occur during an operation.

However, there is a problem in that it is necessary to install the safety fence sufficiently widely such that the worker is not caught between the robot and the safety fence, an installation area of an assembling robot facility increases, and a space inside a factory cannot be used effectively. Further, a production type has been changed to multi-product variable production, and not a dedicated automation facility for each product but a flexible line in which the worker and the assembling robot perform working in cooperation with each other is required.

Here, a safety technology in which the worker safely works in the same space together with the assembling robot is disclosed in, for example, PTL 1 and PTL 2.

A method in which whether or not the assembling robot collides with a surrounding obstacle is predicted through a motion simulation, and when it is determined that the collision occurs, a hand is operated in a direction away from the obstacle is disclosed in PTL 1.

Further, a method in which when a robot arm moves to approach an obstacle ora person, if a distance between a robot and the obstacle or the person approaches a certain value, the robot arm is urgently stopped is disclosed in PTL 2.

CITATION LIST

Patent Literature

PTL 1: JP-A-2010-240782
PTL 2: JP-A-2011-125975

SUMMARY OF INVENTION

Technical Problem

In PTLs 1 and 2 of the above-described related art, safety is determined based on a distance between a robot and an obstacle or a person, and moving velocities and directions of the robot, the obstacle, and the person are not considered. Therefore, when the obstacle or the person is far from the robot, that is, even when a current state is originally safe, the robot is stopped more than necessary in order to urgently stop the robot. As a result, an operation rate of an assembly line decreases.

An object of the present invention is to provide a robot controlling device and an automatic assembling system which can improve safety of a worker and improve an operation rate of a line when the worker and a robot collaborate with each other to perform an assembling operation.

Solution to Problem

In order to solve the above-described problems, there is provided a robot controlling device for an automatic assembling system in which desirably a robot and a worker share a work space. The robot controlling device includes: a robot control instructing unit that outputs an operation instruction to the robot; and a collision avoidance unit, wherein the collision avoidance unit includes a robot operation state inputting unit that inputs an operation state of the robot, a worker operation state inputting unit that inputs a result obtained by sensing an operation state of the worker, a position/velocity vector calculating unit that calculates a position vector and a velocity vector of each of the robot and the worker based on the operation states of the robot and the worker, a risk determination area generating unit that generates a risk determination area set around each of the robot and the worker, a risk determining unit that determines a risk based on overlapping between the extracted risk determination area of the robot and the risk determination area of the worker, a collision avoidance determining unit that determines whether or not avoidance of collision is possible based on the position vectors and the velocity vectors of the robot and the worker, a collision avoidance trajectory generating unit that generates a collision avoidance trajectory of the robot avoiding the collision based on the result determined by the risk determining unit, and a robot control data outputting unit that outputs the collision avoidance trajectory to the robot control instructing unit.

Advantageous Effects of Invention

The present invention can provide a robot controlling device and an automatic assembling system which can improve safety of a worker and improve an operation rate of a line when the worker and a robot collaborate with each other to perform an assembling operation.

BRIEF DESCRIPTION OF DRAWINGS

FIG. 1 is a schematic configuration diagram of an automatic assembling system.

FIG. 2 is a schematic configuration diagram of a robot controlling device.

FIG. 3 is a view illustrating an example of a model information table.

FIG. 4 is a view illustrating an example of a collision avoidance information table.

FIG. 5 is a view illustrating an example of a trajectory generating method information table.

FIG. 6 is a general chart illustrating a process of generating a collision avoidance trajectory in the robot controlling device.

FIG. 7 is a view for illustrating setting of a risk determination area.

FIG. 8 is a flowchart illustrating details of a risk determining process.

FIG. 9 is a view illustrating a method of the risk determining process.

FIG. 10 is a flowchart illustrating details of a collision avoidance trajectory generating process.

FIG. 11 is a flowchart illustrating details of determination on whether or not collision is avoided (part 1).

FIG. 12 is a view illustrating a state immediately before a robot starts a collision avoidance operation (part 1).

FIG. 13 is a flowchart illustrating details of determination on whether or not the collision is avoided (part 2).

FIG. 14 is a view illustrating a state immediately before the robot starts a collision avoidance operation (part 2).

DESCRIPTION OF EMBODIMENTS

Hereinafter, an embodiment of the present invention will be described with reference to FIGS. 1 to 14.

First, a configuration of an automatic assembling system will be described with reference to FIGS. 1 and 2.

An automatic assembling system 100 includes a robot 101, a sensor 103, a robot controlling device 104, and a robot work instructing device 106, as illustrated in FIG. 1.

The robot 101 is a device that performs some operations such as movement, processing, and installation of a component with respect to a workpiece 120 according to an instruction from the robot controlling device 104. The robot controlling device 104 is a device that instructs the robot 101 to operate according to an instruction from the robot work instructing device 106. The robot work instructing device 106 is a device that provides, to the robot controlling device 104, an instruction such as a moving trajectory and a moving timing of a robot. The sensor 103 is a sensing device that identifies a motion of a worker 102. A two-dimensional camera, a three-dimensional camera, and a laser range finder can be used as the sensor 103, or a general sensing device such as an acceleration sensor attached to the worker 102 can be used as the sensor 103.

It is assumed in the automatic assembling system 100 according to the present embodiment that not an unmanned work but a manned work is performed and the worker 102 and the robot collaborate with each other to perform an assembling operation. The automatic assembling system 100 operates the robot 101 by an operation instruction of the robot controlling device 104 according to a work instruction from the robot work instructing device 106. In a workspace, the workpiece 120 is installed, and the robot 101 and the worker 102 assemble components with respect to the workpiece 120. Further, the robot controlling device 104 determines a risk of collision using operation data of the worker 102 acquired by the sensor 103 and data indicating a current robot operation state such as an joint angle, an angular velocity, and an angular acceleration of the robot acquired from the robot controlling device 104, generates a collision avoidance trajectory when it is determined that there is collision, and instructs an avoidance operation by an operation instruction based on the collision avoidance trajectory.

Although a case where the robot is a two-axis controlled robot will be described as an example in the present embodiment, the number of control axes and a configuration of the device are not limited thereto.

Next, a functional configuration of the robot controlling device will be described with reference to FIG. 2.

The robot controlling device 104 is configured with functional units including a robot control instructing unit 105, a collision avoidance unit 109, an input unit 118, a storage unit 119, a display unit 121, and a communication unit 122. Further, the collision avoidance unit 109 is configured with subcomponents including a robot operation state inputting unit 111, a worker operation state inputting unit 112, a position/velocity vector calculating unit 113, a risk determination area generating unit 114, a risk determining unit 115, a collision avoidance trajectory generating unit 116, a collision avoidance determining unit 124, a robot control data converting unit 117, and a robot control data outputting unit 123. The storage unit 119 stores a model information table 300, a collision avoidance information table 400, a trajectory generating method information table 500, and a robot control instructing history 600.

The robot control instructing unit 105 is a unit that provides an operation instruction to the robot 101. The collision avoidance unit 109 is a unit that generates a collision avoidance trajectory for avoiding a collision between the worker 102 and the robot 101, and outputs the collision avoidance trajectory to the robot control instructing unit 105.

The robot operation state inputting unit 111 of the collision avoidance unit 109 is a unit that acquires, from the robot control instructing history 600, data indicating the current robot operation state such as the joint angle, the angular velocity, and the angular acceleration of the robot 101. The worker operation state inputting unit 112 is a unit that acquires data indicating an operation state of the worker, such as a position, a velocity, and an acceleration, indicating movement of the worker 102 sensed by the sensor 103. The position/velocity vector calculating unit 113 is a unit that extracts a position vector and a velocity vector of each representative point from robot operation data and worker operation data acquired by the robot operation state inputting unit 111 and the worker operation state inputting unit 112. The risk determination area generating unit 114 is a unit that generates information on a risk determination area of the robot 101 and the worker 102 using model data of the robot 101 and the worker 102 stored in the model information table 300 and the position vector and the velocity vector of the robot 101 and the worker 102 calculated by the position/velocity vector calculating unit 113. The risk determining unit 115 is a unit that determines a risk of the collision based on the information on the risk determination area of the robot and the information on the risk determination area of the worker generated by the risk determination area generating unit 114. The collision avoidance trajectory generating unit 116 is a unit that generates a trajectory for evacuating the robot 101 from the worker 102. The collision avoidance determining unit 124 is a unit that determines whether or not avoidance of collision is possible in the generated collision avoidance trajectory used in a collision avoidance trajectory generating process. The robot control data converting unit 117 is a unit that converts an avoidance trajectory of the robot generated by the collision avoidance trajectory generating unit 116 into a control signal of the robot. The robot control data outputting unit 123 is a unit that outputs robot control data generated by the robot control data converting unit 117 to the robot control instructing unit 105.

An input unit 118 is a unit that inputs setting information necessary for generating the collision avoidance trajectory, such as the model data of the robot 101 and the worker 102, a risk determination condition, and an avoidance trajectory generating condition and inputs a menu selection instruction or the other instructions. The input information is stored in each table of the storage unit 119. The display unit 121 is a display unit that displays an evaluation target model, input information, a result of processing, and a history of the processing. The communication unit 122 is a unit that transmits/receives data between the robot 101, the sensor 103, and the robot work instructing device 106.

Each functional component of the robot controlling device 104 may be realized by dedicated hardware logic. A general information processing apparatus such as a personal computer may be realized by executing a program realizing each function. In this case, a central processing unit (CPU) loads a program and a table installed in an auxiliary storage device including a hard disk drive (HDD) and a solid state drive (SSD) in a main storage device including a random access memory (RAM), and references and executes the program and the table.

Further, in this case, the input unit 118 is, for example, a keyboard, a mouse, etc. In addition, a touch panel, a dedicated switch, a sensor, or a voice recognition device may be used as the input unit 118. The display unit 121 is a device that displays information on a screen, such as a display, a projector, and a head-mounted display. Further, a printer (not illustrated) that outputs the information displayed on the display unit 121 to a paper sheet may be connected to the robot controlling device 104.

Further, the robot controlling device 104 may share hardware with the robot 101 and the robot work instructing device 106.

Although an algorithm based on assumption that the robot has one arm is described in the present embodiment, the present invention is not limited to the robot having one arm. The number of arms may be two or more or the number of driving shafts may be that or more of a six-axis robot such as a machine having linear motion axes of XYZ.

Details of each table stored in the storage unit 119 will be described below. The robot control instructing history 600 stored in the storage unit 119 is history information of an instruction provided to the robot by the robot control instructing unit 105.

Next, a data structure referenced by the robot controlling device will be described with reference to FIGS. 3 to 5.

The model information table 300 is a table storing basic data (model information) for providing a work instruction to the robot, and includes storage fields of robot model information 301, worker model information 302, and work environment model information 303, as illustrated in FIG. 3. The robot model information 301 is a field storing information on a robot structure and an accessory, and has information including middle items such as the number 301a of links, a link dimension 301b, link connection information 301c, robot representative point coordinates 301d, a gripped object size 301e, and gripping coordinates 301f.

The number 301a of links is the number of components (links) constituting the robot arm. The link dimension 301b corresponds to dimensions of the components. The link connection information 301c is information on joints connecting the links. The robot representative point coordinates 301d are coordinates of a representative point of the robot obtained by calculating a robot velocity vector. The gripped object size 301e is the size of an object gripped by the robot 101. The gripping coordinates 301f are coordinates of the object.

The link connection information 302c includes the name of the links constituting the joints and the forms of the joints such as a rotary axis and a linear motion axis.

The worker model information 302 has middle items that are similar to those of the robot model information 301 although names of the middle items of the worker model information 302 are slightly different from those of the robot model information 301. The meanings of the middle items are similar to movement of a body of the worker with respect to the robot in a pseudo manner. Although it is described in the present embodiment that a worker model ranges from an elbow to a finger of one arm, there may be a model including a body and both arms.

The work environment model information 303 has information including middle items such as work position coordinates 303a, workbench information 303b, a robot origin position 303c, a worker origin position 303d, and a sensor installation origin position 303e.

The work position coordinates 303a corresponds to coordinates indicating a work position in a workbench. The workbench information 303b is data describing the geometry of the workbench. The robot origin position 303c corresponds to coordinates indicating an origin position of the robot 101 installed in the workbench. The worker origin position 303d corresponds to coordinates indicating a standing position of the worker 102 who works near the workbench. The sensor installation origin position 303e corresponds to coordinates indicating an installation position of the sensor 103 that detects movement of the worker 102.

The collision avoidance information table 400 is a table storing data for avoiding the collision between the robot 101 and the worker by the robot controlling device 104, and has a collision avoidance time 401, a deceleration condition 402, a risk determination area width 403, and approach distance information 404, as illustrated in FIG. 4.

The collision avoidance time 401 is time information used for setting an enlarged width of a collision avoidance determination area in a direction of the velocity vector and for avoiding the collision. The deceleration condition 402 is a condition of a robot operation when it is determined to decelerate the robot. The risk determination area width 403 is information for setting an area width for determining a risk in a relative position between the robot 101 and the worker 102. The approach distance information 404 is information for determining that there is a risk when the robot 101 and the worker 102 approach each other.

The collision avoidance time 401 has information on middle items such as a stop area collision avoidance time 401a, an evacuation area collision avoidance time 401b, and a deceleration area collision avoidance time 401c which can be set for a stop area, an evacuation area, and a deceleration area, respectively. The deceleration condition 402 has information on middle items such as a deceleration operating velocity upper limit 402a, a worker velocity ratio 402b, and a robot instructing value velocity ratio 402c.

The deceleration operating velocity upper limit 402a is information on an upper limit value of a velocity when the robot 101 decelerates. The worker velocity ratio 402b is a deceleration ratio with respect to the velocity of the worker. The robot instructing value velocity ratio 402c is a deceleration ratio with respect to a robot instructing value.

The risk determination area width 403 has information on middle items such as a stop area risk determination area width 403a, an evacuation area risk determination area width 403b, and a deceleration area risk determination area width 403c which can be set for the stop area, the evacuation area, and the deceleration area, respectively.

The approach distance information 404 has information on a middle item such as a minimum approach distance 404a. The minimum approach distance 404a is a minimum approach distance at which it is determined that the worker 102 is safe.

The trajectory generating method information table 500 is a table storing information for generating a trajectory with respect to the robot 101, and includes the number 501 of methods and a trajectory generating method information 502, as illustrated in FIG. 5.

The number 501 of methods is the number of methods stored in the table. The trajectory generating method information 502 has various pieces of information on a trajectory generating method.

The trajectory generating method information 502 includes information on middle items such as a method number 502a, a method name 502b, trajectory generating algorithm link information 502c, a priority 502d, a collision avoidance determination result 502e, and collision avoidance trajectory data 502f.

The method number 502a is an identification number in this table. The method name 502b is a name for this method. The trajectory generating algorithm link information 502c is information on a path when a trajectory generating algorithm is called. The priority 502d is information indicating a priority of an applied algorithm. The collision avoidance determination result 502e is result information on whether or not the avoidance of collision is possible. The collision avoidance trajectory data 502f is point sequence data of the collision avoidance trajectory.

Next, a process of generating a collision avoidance trajectory in a collision avoidance unit of a robot controlling device will be described with reference to FIGS. 6 to 14.

The collision avoidance unit 109 determines a risk of collision based on sensing data of the robot 101 and the worker 102 obtained by the sensor 103, and generates the collision avoidance trajectory and outputs the collision avoidance trajectory to the robot control instructing unit 105 when it is determined that there is the risk of collision.

First, the robot operation state inputting unit 111 of the collision avoidance unit 109 performs a robot state acquiring process (S11). In the robot state acquiring process, an angle of each joint of the robot is acquired from the robot control instructing history 600. To feedback a state of the robot to robot control in a short time, it is preferable that an acquisition interval ranges from several milliseconds to several tens of milliseconds. Further, in a method of acquiring the joint angle of the robot, the joint angle may be acquired by a general sensor such as the acceleration sensor installed in the robot, the two-dimensional camera or the three-dimensional camera, and the laser range finder provided in the outside. The joint angle of the robot can be calculated by comparing data obtained by the two-dimensional camera or the three-dimensional camera, the laser range finder, or the like, with the robot model information stored in the model information table 300.

In parallel to S11, the worker operation state inputting unit 112 performs a sensing data acquiring process (S12). In this process, an operation of the worker 102, for example, a motion state of an arm, is acquired. Even in the sensing data acquiring process, like the robot state acquiring process, it is preferable that coordinates of the arm is acquired at intervals of several milliseconds to several tens of milliseconds, and the result is fed back to the robot control. When data is acquired, the data may be acquired by a general sensor such as the acceleration sensor installed in an arm of the worker 102, the two-dimensional camera or the three-dimensional camera, and the laser range finder provided in the outside. The angle and the position of the arm of the worker can be calculated by comparing the data obtained by the two-dimensional camera or the three-dimensional camera, the laser range finder, or the like, with the worker model information stored in the model information table 300.

Next, the position/velocity vector calculating unit 113 performs a position/velocity vector calculating process (S13). In this process, the position vector and the velocity vector of the representative point of the robot 101 are calculated from information on the joint angle of the robot acquired by the robot state acquiring process of S11 and the robot model information stored in the model information table 300, and the position vector and the velocity vector of the representative point of the worker are calculated from information of the joint angle of the worker 102 acquired by the sensing data acquiring process and the worker model information stored in the model information table 300. Here, the representative point is a point at which the risk of collision is high, such as a tip of a hand or a tip of an object that the hand is holding. The point at which the risk of collision is high varies depending on a relative position relationship between the robot 101 and the worker 102 and work contents.

Next, the risk determination area generating unit 114 performs a risk determination area generating process (S14). In this process, the risk determination area is generated using the position vector and the velocity vector of the representative point of the robot 101 and the worker 102 acquired by the position/velocity vector calculating process of S13 and the robot model information and the worker model information stored in the model information table 300.

Here, setting of the risk determination area will be described with reference to FIG. 7. The risk determination area includes stop areas 201a and 201b, evacuation areas 202a and 202b, and deceleration areas 203a and 203b, and at least one of these areas is set. The risk determination area is used to determine that the robot is stopped when the worker 102 intrudes into the stop area 201b of the robot, the robot is evacuated when the worker 102 intrudes into the evacuation area 202b of the robot, and the robot is decelerated when the worker 102 intrudes into the deceleration area 203b of the robot.

The risk determination area is three-dimensionally set based on the risk determination area width 403 stored in the collision avoidance information table 400 using positions of the robot 101 and the worker 102 at each time as a reference. Further, it is assumed that each region is enlarged in the directions of velocity vectors 204a and 204b. An expansion width is obtainedbymultiplying the collision avoidance time by the velocity vector using the collision avoidance time 401 stored in the collision avoidance information table 400.

Next, the risk determining unit 115 performs a risk determining process (S15).

When stop is determined by the risk determining process, a status of the "stop" is provided (S21) and is transmitted to the robot control instructing unit 105 (S23), and the robot 101 is immediately stopped. When deceleration is determined by the risk determining process, a status of the "deceleration" is provided (S20) and is transmitted to the robot control instructing unit 105 (S23), and the robot 101 continues to perform an operation after an operation velocity is reduced. At this time, an operation trajectory is a trajectory instructed by the robot work instructing device 106. A velocity reduction ratio is calculated by using the deceleration condition 402 stored in the collision avoidance information table 400, for example, by using a deceleration operating velocity upper limit 402a, the worker velocity ratio 402b with respect to the size of the velocity vector of the worker 102, and the robot instructing value velocity ratio 402c with respect to the magnitude of a velocity instructed by the robot work instructing device 106. When non-avoidance is determined by the risk determining process, a status of the "non-avoidance" is provided (S19) and is transmitted to the robot control instructing unit 105 (S23), and the robot 101 executes an operation instructed by the robot work instructing device 106 without changing the operation. When evacuation is determined, a state of the "evacuation" is provided (S22), the collision avoidance trajectory generating process (S16), the robot data converting process (S17), and the collision avoidance trajectory outputting process (S18) are performed, and collision avoidance trajectory information is output to the robot control instructing unit 105. Thereafter, the determination result "evacuation" is transmitted to the robot control instructing unit 105 (S23), and a robot operation is switched to the collision avoidance trajectory output in S18.

The robot control data converting process of S17 is a process executed by the robot control data converting unit 117. This process is a process of converting a robot-specific language and a sequence of points of the joint angle of the robot indicating an avoidance trajectory into general data for controlling the robot.

The avoidance trajectory outputting process of S18 is a process executed by the robot control data outputting unit 123. This process is a process of outputting the robot control data generated by the robot control data converting unit 117 to the robot control instructing unit 105.

Next, the risk determining process of S15 will be described with reference to FIGS. 8 and 9.

In the risk determining process, first, as illustrated in FIG. 9(*a*), it is determined whether an overlapping area exists between the stop areas 201*a* and 201*b* of the robot 101 and the worker 102 (S31). Here, when it is determined that the overlapping area exists between the stop areas, the determination result "stop" is output (S35). When the overlapping area does not exist between the stop areas, it is determined whether the overlapping area exists between the evacuation areas 202*a* and 202*b* (S32). Here, when it is determined that the overlapping area exists between the evacuation areas, the determination result "evacuation" is output (S36). When the overlapping area does not exist between the evacuation areas, it is determined whether the overlapping area exists between the deceleration areas 203*a* and 203*b* (S33), as illustrated in FIG. 9(*b*). Here, when it is determined that the overlapping area exists between the deceleration areas, the determination result "deceleration" is output (S37). Here, when the overlapping area does not exist between the deceleration areas, it is determined that avoidance is not necessary, and the determination result "non-avoidance" is output (S34).

As described above, the risk is determined in a descending order of a risk, that is, in an order in which the robot 101 and the worker 102 approach each other, and an instruction operation provided to the robot 101 is allocated as "stop", "evacuation", and "deceleration", so that an operation instruction correctly determining a risk level can be provided. An interference checking algorithm for general three-dimensional point group data can be used to detect an overlapping portion of the risk determination area. Further, when model information of the robot 101 and the worker 102 stored in the model information table 300 is represented in a simple shape, for example, a combination of a sphere and a cylinder, the interference checking process can be executed in a short time.

Next, the collision avoidance trajectory generating process of S16 will be described with reference to FIG. 10.

The collision avoidance trajectory generating process is executed and processed by the collision avoidance trajectory generating unit 116.

First, in one of various trajectory avoidance generating methods stored in the trajectory generating method information table 500, the collision avoidance trajectory is generated, and point sequence data of the trajectory is stored in the trajectory generating method information table 500 (S40). Next, it is determined whether or not avoidance is possible, and a result of the determination is stored in the trajectory generating method information table 500 (S41).

Next, determination on whether or not the avoidance is possible (S42) is performed on all avoidance trajectory generating methods stored in the trajectory generating method information table 500. When there is an avoidance trajectory generating method by which whether or not the avoidance is possible is not determined, the process proceeds to S40.

Next, determination on whether or not there is a generating method in which a result of the determination is "avoidable" (S43) is performed based on avoidance determining result information stored in the trajectory generating method information table 500. When there is no generating method in which a result of the determination is "avoidable", a stop signal is output to the robot control instructing unit 105 (S46). When there is an avoidance trajectory generating method in which a result of the determination is "avoidable", one method, of which a result of the determination on whether or not the avoidance is possible is "avoidable", and which has the highest priority, is selected from the trajectory generating method information table 500 of FIG. 5 (S44), and a method number, and the like of the selected avoidance trajectory generating method is output (S45).

The robot controlling device 104 acquires point sequence data of the collision avoidance trajectory associated with the output collision avoidance trajectory generating method number, and instructs an evacuation operation of the robot 101. An algorithm of generating various collision avoidance trajectories such as a trajectory in which movement is performed in parallel to the velocity vector of the worker and a trajectory in which movement is performed in a direction in which an angle with the velocity vector of the worker is an acute angle, with reference to, for example, a trajectory reverse to a path through which movement has been performed until now and the worker velocity vector as a robot evacuating trajectory can be stored in the trajectory generating method information table 500 and can be used for generating the collision avoidance trajectory.

For example, a direction of the velocity vector of the robot, in which a distance between the robot and the worker after a unit time, which is calculated based on the velocity vector of the robot and the velocity vector of the worker when the avoidance of collision starts, increases, can be used as the collision avoidance trajectory.

Further, a direction of the velocity vector of the robot, in which a minimum distance between on the velocity vector of the robot and the velocity vector of the worker when the avoidance of collision starts is larger than a predetermined value, can be used as the collision avoidance trajectory.

Next, the collision avoidance determining process of S41 will be described with reference to FIGS. 11 and 12.

As illustrated in FIG. 12, in a robot velocity vector Vr (Rx, Ry, Rz) and a worker velocity vector Vw (Wx, Wy, Wz) of the worker 102 when the robot 101 starts a collision avoidance operation, a starting point R0 (Xr0, Yr0, Zr0) of the robot velocity vector Vr is a current position of the robot 101, a starting point W0 (Xw0, Yw0, Zw0) of the worker velocity vector Vw is a current position of the worker, and positions of the robot 101 and the worker 102 when a unit time elapses are R1 and W1, respectively.

In the avoidance determining process, first, a distance D0 between the starting point R0 of the robot velocity vector and the starting point W0 of the worker velocity vector is calculated using Equation (1) (S51). Next, the position R1 of the robot and the position W1 of the worker when a unit time elapses are calculated based on the robot velocity vector Vr and the worker velocity vector Vw using Equation (2) and Equation (3) (S52). Next, the distance D1 between R1 and W1 is calculated using Equation (4) (S53), and whether or not the avoidance is possible is determined using Equation (5) (S54). Here, when it is determined that the avoidance is possible, "avoidable" is stored in the trajectory generating method information table 500 (S55), and when it is determined that the avoidance is impossible, "unavoidable" is stored in the trajectory generating method information table 500 (S56).

$$|D0|^2 = (Xr0 - Xw0)^2 + (Yr0 - Yw0)^2 + (Zr0 - Zw0)^2 \quad \text{Equation (1)}$$

$$R1 = (Xr0 + Rx, Yr0 + Ry, Zr0 = Rz) \quad \text{Equation (2)}$$

$$W1 = (Wr0 + Wx, Wr0 + Wy, Wr0 + Wz) \quad \text{Equation (3)}$$

$$|D1|^2 = |R1 - W1|^2 = \quad \text{Equation (4)}$$
$$(Wr0 + Ry - Yw0 - Wy)^2 + (Zr0 + Rz - Zw0 - Wz)^2$$

$$\text{If } |D0|^2 < |D1|^2 \ldots\ldots \text{ Avoidable} \quad \text{Equation (5)}$$
$$\text{If } |D0|^2 \geq |D1|^2 \ldots\ldots \text{ Unavoidable}$$

Next, another example of the collision avoidance determining process of S41 will be described with reference to FIGS. 13 and 14.

As illustrated in FIG. 14, when the robot 101 starts an avoidance operation, the position of the robot is R0, the robot velocity vector is Vr, the position of the worker 102 is W0, and the worker velocity vector is Vw. A point Rt on a straight line Lr passing through R0 and parallel to Vr and a point Ws on a straight line Lw passing through W0 and parallel to Vw are represented by Equation (6) and Equation (7). Here, s and t are predetermined real numbers.

$$Rt = R0 + tVr = (XRr0 + tRx, Yr0 + tRy, Zr0 + tRz) \quad \text{Equation (6)}$$

$$Ws = W0 + sVw = (Xw0 + sWx, Yw0 + sWy, Zw0 + sWz) \quad \text{Equation (7)}$$

First, whether or not the robot velocity vector Vr and the worker velocity vector Vw are parallel to each other is determined (S61). When the two straight lines are parallel to each other, a distance between the two straight lines is calculated as the shortest distance D3 (S62). When the two straight lines are not parallel to each other and are located in a skew position, the common perpendicular line Lh of the straight line Lr passing through R0 and parallel to Vr and the straight line Lw passing through W0 and parallel to Vw is obtained (S63). Since the length of the common perpendicular line is the shortest distance between the two straight lines, the length of the common perpendicular line is calculated as the shortest distance D3 (S64).

Next, a minimum approach distance C stored in the approach distance information of the collision avoidance information table 400 is referenced, and the shortest distance D3 and the minimum approach distance C are compared with each other (S65). When the shortest distance D3 is larger than the minimum approach distance C, since the robot and the worker do not collide with each other at any point of the straight lines Lr and Lw, "avoidable" is stored in trajectory generating method information 133 (S68). When the shortest distance D3 is equal to or less than the minimum approach distance C, t2 indicating an intersection point R2 between the straight line Lr and the common perpendicular line Lh is obtained from Equation (6), and s2 indicating an intersection point W2 between the straight line Lw and the common perpendicular line Lh is obtained from Equation (7) (S66).

Next, t2 and s2 are determined (S67). When t2≤0 and s2≤0 are satisfied, both the robot 101 and the worker 102 move to become further away from the intersection points R2 and W2 with the common perpendicular line. Thus, since a distance therebetween increases, "avoidable" is stored in the trajectory generating method information 133 (S68). Meanwhile, when t2≤0 and s2≤0 are not satisfied (that is, when t2>0 and s2>0 are satisfied), "unavoidable" is stored in the trajectory generating method information 133 (S69). Here, since the minimum approach distance C is set to, for example, a maximum value of the size of a gripped object, which is stored in the model information table 300, it can be determined whether or not there is collision between the robot 101 and the worker 102.

According to the above-described robot controlling device according to the present embodiment, when the robot and the worker perform work while sharing a space, the robot can be operated for a long time while safety of the worker is guaranteed, and facility operation rate can be improved.

REFERENCE SIGNS LIST

100 . . . Automatic assembling system
101 . . . Robot
102 . . . Worker
104 . . . Robot controlling device
106 . . . Robot work instructing device
120 . . . Work
201 . . . Stop area
202 . . . Evacuation area
203 . . . Deceleration area

The invention claimed is:

1. A robot controlling device for an automatic assembling system in which a robot and a worker share a work space, the device comprising:
at least one memory configured to store one or more programs; and
at least one processor coupled to the at least one memory and configured to execute the one or more programs to:
input an operation state of the robot,
input a result obtained by sensing an operation state of the worker,
calculate a position and a velocity vector of each of the robot and the worker based on the operation states of the robot and the worker,
generate a risk determination area set around each of the robot and the worker,
determine a risk based on overlapping between the risk determination area of the robot and the risk determination area of the worker,
determine whether or not avoidance of collision is possible based on the calculated positions and the calculated velocity vectors of the robot and the calculated positions and the calculated velocity vectors of the worker,
generate a collision avoidance trajectory of the robot avoiding the collision based on the determined risk,
convert the generated collision avoidance trajectory into robot control data, and output an operation instruction to the robot comprising the robot control data based on the generated collision avoidance trajectory, wherein the risk determination area of the robot comprises one or more of a stop area, an evacuation area, and a deceleration area, wherein the risk determination area of the worker comprises one or more of a stop area, an evacuation area, and a deceleration area, wherein a collision avoidance trajectory for stopping the robot is generated when the stop area of the robot and the stop area of the worker overlap each other, a collision avoidance trajectory for evacuating the robot is generated when the evacuation area of the robot and the evacuation area of the worker overlap each other, and a collision avoidance trajectory for decelerating the robot is generated when the deceleration area of the robot and the deceleration area of the worker overlap each other.

2. The robot controlling device according to claim 1, wherein a trajectory tracing a path, in which the robot has moved from a start of the collision avoidance determination until now, in an opposite direction is set as the collision avoidance trajectory.

3. The robot controlling device according to claim 1, wherein the generated collision avoidance trajectory comprises a direction that is parallel to the velocity vector of the worker.

4. The robot controlling device according to claim 1, wherein the generated collision avoidance trajectory comprises a direction of the velocity vector of the robot, in which a distance between the robot and the worker increases after a unit time, the unit of time is calculated based on the velocity vector of the robot and the velocity vector of the worker when avoidance of collision starts.

5. The robot controlling device according to claim 1, wherein the generated collision avoidance trajectory comprises a direction of the velocity vector of the robot, in which a minimum distance between the velocity vector of the robot and the velocity vector of the worker, when avoidance of collision starts, becomes larger than a predetermined value.

6. An automatic assembling system in which a robot and a worker share a work space, the system comprising:
 a robot controlling device that provides an operation instruction for controlling the robot;
 a robot work instructing device that provides an operation instruction to the robot controlling device;
 a sensor that senses an operation of the worker,
 wherein an operation state of the robot is input to the robot controlling device,
 wherein an operation state of the worker is input from the sensor to the robot controlling device,
 wherein the robot controlling device calculates a position and a velocity vector of each of the robot and the worker from the operation state of the robot and the operation state of the worker, and
 wherein the robot controlling device generates a risk determination area around each of the robot and the worker, determines a risk based on overlapping between the risk determination area of the robot and the risk determination area of the worker,
 determines whether or not avoidance of collision is possible based on the calculated positions and the calculated velocity vectors of the robot and the calculated positions and the calculated velocity vectors of the worker, and generates a collision avoidance trajectory in which collision between the robot and the worker is avoided, from a result of the determination of the risk, and the robot controlling device provides the operation instruction for controlling the robot based on the generated collision avoidance trajectory, wherein the risk determination area of the robot comprises one or more of a stop area, an evacuation area, and a deceleration area, wherein the risk determination area of the worker comprises one or more of a stop area, an evacuation area, and a deceleration area, wherein a collision avoidance trajectory for stopping the robot is generated when the stop area of the robot and the stop area of the worker overlap each other, a collision avoidance trajectory for evacuating the robot is generated when the evacuation area of the robot and the evacuation area of the worker overlap each other, and a collision avoidance trajectory for decelerating the robot is generated when the deceleration area of the robot and the deceleration area of the worker overlap each other.

7. The automatic assembling system according to claim 6, wherein a trajectory tracing a path, in which the robot has moved from a start of the collision avoidance determination until now, in an opposite direction is set as the collision avoidance trajectory.

8. The automatic assembling system according to claim 6, wherein the generated collision avoidance trajectory comprises a direction that is parallel to the velocity vector of the worker.

9. The automatic assembling system according to claim 6, wherein the generated collision avoidance trajectory comprises a direction of the velocity vector of the robot, in which a distance between the robot and the worker increases after a unit time, the unit of time is calculated based on the velocity vector of the robot and the velocity vector of the worker when avoidance of collision starts.

10. The automatic assembling system according to claim 6, wherein the generated collision avoidance trajectory comprises a direction of the velocity vector of the robot, in which a minimum distance between the velocity vector of the robot and the velocity vector of the worker, when avoidance of collision starts, becomes larger than a predetermined value.

11. The robot controlling device according to claim 1, where the risk determination area of the robot is enlarged in a direction of the velocity vector of the robot and the risk determination area of the worker is enlarged in a direction of the velocity vector of the worker.

12. The robot controlling device according to claim 1, wherein
 if the stop area of the robot and the stop area of the worker do not overlap, the collision avoidance trajectory for evacuating the robot is generated when the evacuation area of the robot and the evacuation area of the worker overlap each other, and
 if the stop area of the robot and the stop area of the worker do not overlap and the evacuation area of the robot and the evacuation area of the worker do not overlap, the collision avoidance trajectory for decelerating the robot is generated when the deceleration area of the robot and the deceleration area of the worker overlap each other.

* * * * *